US012686768B2

(12) United States Patent
Dou et al.

(10) Patent No.: US 12,686,768 B2
(45) Date of Patent: Jul. 21, 2026

(54) POLYBUTYLENE TEREPHTHALATE COMPOSITION AND RADAR DEVICE COMPONENT THEREOF

(71) Applicant: BASF SE, Ludwigshafen (DE)

(72) Inventors: Rui Dou, Shanghai (CN); Zhen Ke Wei, Shanghai (CN); Ping Li, Shanghai (CN)

(73) Assignee: BASF SE, Ludwigshafen (DE)

( * ) Notice: Subject to any disclaimer, the term of this patent is extended or adjusted under 35 U.S.C. 154(b) by 635 days.

(21) Appl. No.: 18/035,953

(22) PCT Filed: Nov. 12, 2021

(86) PCT No.: PCT/EP2021/081500
§ 371 (c)(1),
(2) Date: May 9, 2023

(87) PCT Pub. No.: WO2022/101399
PCT Pub. Date: May 19, 2022

(65) Prior Publication Data

US 2023/0416523 A1 Dec. 28, 2023

(30) Foreign Application Priority Data

Nov. 16, 2020 (WO) ................ PCT/CN2020/129044

(51) Int. Cl.
*C08L 67/02* (2006.01)
*C08K 3/40* (2006.01)
*C08K 7/14* (2006.01)
*G01S 7/00* (2006.01)

(52) U.S. Cl.
CPC ................ *C08L 67/02* (2013.01); *C08K 3/40* (2013.01); *C08K 7/14* (2013.01); *G01S 7/006* (2013.01)

(58) Field of Classification Search
CPC .............. C08L 67/02; C08K 7/14; C08K 3/40
See application file for complete search history.

(56) References Cited

U.S. PATENT DOCUMENTS

| | | | | |
|---|---|---|---|---|
| 3,257,357 | A | 6/1966 | Gelu | |
| 3,306,874 | A | 2/1967 | Hay | |
| 3,306,875 | A | 2/1967 | Hay | |
| 6,008,298 | A | 12/1999 | Hatke et al. | |
| 2016/0304712 | A1* | 10/2016 | Yamamoto ............... | C08K 5/49 |

FOREIGN PATENT DOCUMENTS

| | | | |
|---|---|---|---|
| EP | 3464449 | B1 | 8/2019 |
| EP | 3680288 | A1 | 7/2020 |
| GB | 953488 | A | 3/1964 |
| WO | WO-2019/213920 | A1 | 11/2019 |

OTHER PUBLICATIONS

Deng et al (CN 110218382), English translation published on Sep. 10, 2019.*

International Application No. PCT/EP2021/081500, International Search Report and Written Opinion, mailed Jan. 24, 2022.

* cited by examiner

*Primary Examiner* — Gregory Listvoyb
(74) *Attorney, Agent, or Firm* — Grüneberg Global IP, PLLC

(57) ABSTRACT

The invention discloses a polybutylene terephthalate composition comprising as component (A) polybutylene terephthalate resin in an amount of from 40 wt % to 90 wt %, as component (B) glass fiber having low dielectric constant and dissipation factor measured according to GB 9534-88 in an amount of 10 wt % to 60 wt %. The invention also disclosed a radar device component containing the polybutylene terephthalate composition.

14 Claims, No Drawings

POLYBUTYLENE TEREPHTHALATE COMPOSITION AND RADAR DEVICE COMPONENT THEREOF

CROSS-REFERENCE TO RELATED APPLICATIONS

This is the U.S. national phase of International Application No. PCT/EP2021/081500, filed Nov. 12, 2021, which claims the benefit of International Patent Application No. PCT/CN2020/129044, filed Nov. 16, 2020.

FIELD OF THE INVENTION

The present invention relates to a radar device component and a polybutylene terephthalate composition.

DESCRIPTION OF THE RELATED ART 5G is the 5th generation mobile network. It is a new global wireless standard after 1G, 2G, 3G, and 4G networks. 5G enables a new kind of network that is designed to connect virtually everyone and everything together including mobile communication devices. 5G wireless technology is meant to deliver higher multi-Gbps peak data speeds, ultra-low latency, more reliability, massive network capacity. The frequency band used in 5G is estimated to targeted millimeter wavelength, the estimated frequency range will be from 3-100 gigahertz (GHz) which is much higher than current 3G/4G networks. Electromagnetic (EM) waves propagated into plastic materials results in reflection, absorption and transmittance behaviors. Materials with high dielectric constant (Dk) or dissipation factor (Df) will reflect and absorb more EM waves respectively. Dielectric property refers to the extent to which a material concentrates electric flux and the energy loss rate, usually expressed as dielectric constant Dk and dissipation factor Df. A high dielectric constant and dissipation factor is not necessarily desirable for high frequency industry. As Dk and Df increases, the electric flux density and energy loss increases. The accumulation of charge will disturb the signal transmission, reduce the reliability of electric circuit, limit the further increase of frequency. The energy loss will generate heat and influence the use. In another aspect, substances with high dielectric constants break down more easily when subjected to intense electric fields, than do materials with low dielectric constants. In this case, low dielectric constant/dissipation factor (Dk/Df) materials become more vital for the electrical devices without signal delay and high transmission efficiency. Dielectric performance is regarded as one of important factor to be considered for radio-frequency (RF) devices, e.g. base station, smart phone, laptop and millimeter-wave radar.

Radome in automotive radar, as the window of antenna, has a function of protecting antenna units, to make sure the stability of electrical units and high efficiency of signal receive and emit. The frequency employed for automotive radar will be as high as 76 GHz-81 GHz. At such high frequency, a very small increased Dk and Df of plastic will strongly deteriorate the performance of radar. Thus, EM wave transparent plastic materials with quite low Dk and low Df is often used in radome part.

Beside of dielectric performance, plastic for use in radome components should also have other mechanical performance such as high modulus, high impact strength, high laser transmittance, low coefficient of thermal expansion (CTE). High performance materials are often obtained by incorporating glass fiber, carbon fiber or minerals. However, traditional filler often increases the Dk and Df of polymer composites which is hard to balance mechanical and dielectric performance.

Laser welding is becoming the major automotive radar assembling process due to its high production efficiency. Laser welding technology require=for high laser transmittance. However, laser welding of partially crystalline thermoplastics is in principle more difficult than that of amorphous plastics. Partially crystalline thermoplastics have a spherulitic microstructure containing phases with a different refractive power. This means that the laser beam is widened more, and the backward scattering is greater. This problem, which is common to all partially crystalline plastics, was particularly apparent with PBT. The addition of reinforcing fillers and low dielectric fillers will furtherly reduce the laser transmission because of the light scattering on interface. It's a challenging problem of PBT assembly via laser welding.

EP 3464449B1 disclosed a thermoplastic composition, which comprises polymeric base resin, a low dielectric constant (Dk)/low dissipation factor (Df) glass fiber component, wherein the low Dk/low Df glass fiber component has a Dk of less than 5.0 at a frequency from 1 MHz to 1 GHz and a Df of less than 0.002 at a frequency of from 1 MHz to 1 GHz. The polymeric based could be polypropylene, poly (p-phenylene oxide) (PPO), polystyrene (PS), polycarbonate (PC), polybutylene terephthalate (PBT), polyethylene terephthalate (PET), polyamide (PA), in which PPO, PS, PC are the amorphous polymers. The patent provides a low dielectric thermoplastic composition via adding low dielectric glass fibers. Since semi-crystalline or amorphous polymers are also selected as the base resins, the patent didn't solve the difficulty in laser welding for semi-crystalline polymers.

WO2019213920 disclosed a polymer composition having electrical insulating properties comprising 40 wt % of a semi-crystalline aromatic thermoplastic polymer, a polymeric filler comprising high density polyethylene particle, the polymer filler being present in the polymer composition sufficient to lower the dielectric constant of the thermoplastic polymer by more than 2% when tested at frequency of 2.5 GHz; and optionally glass fiber having a dielectric constant at a frequency of 1 GHz of less than about 6. The technology decreases the dielectric constant by using polymeric filler such as UHMWPE powder having low Dk, but it can't solve the laser welding problem of PBT.

SUMMARY OF THE INVENTION AND ADVANTAGES

The aim of the present invention is therefore to provide a PBT composition, which shows good laser welding performance as well as lower dissipation factor, and thereby less problems when applied into high frequency communication articles.

This aim has been achieved with the polybutylene terephthalate composition according to the invention, preferably used for radome component, comprising as component (A) polybutylene terephthalate (PBT) resin in an amount of from 40 wt % to 90 wt %, as component (B) glass fiber having dielectric constant (Dk) of equal to or less than 4.6 and dissipation factor (Df) of less than 0.004 at a frequency from 1 GHz to 78 GHz, and Dk of equal to or less than 4.2 and Df of 0.001 to 0.0035 at a frequency of 79 GHz to 85 GHz, the dielectric constant Dk and dissipation factor Df of glass fibers is measured according to GB 9534-88 in an amount of 10 wt % to 60 wt %.

The other aim of the present invention is therefore to provide a radar device component containing the PBT composition according to the present invention.

The other aim of the present invention is therefore to provide a method for preparing the polybutylene terephthalate composition.

In the invention, the terms "a", "an" and "the" are used interchangeable with the term "at least one". The phrases "at least one of" and "comprises at least one of" followed by a list refers to any one of the items in the list and any combination of two or more item in the list. All numerical ranges are inclusive of their endpoints and non-integral values between the endpoints unless otherwise stated.

The terms "first", "second" and "third" are used in this disclosure merely as a matter of convenience in the description of one or more of the embodiments. It will be understood that, unless otherwise noted, those terms are used in their relative sense only.

The term "glycol" is an aliphatic diol containing two hydroxyl groups (—OH groups) attached to different carbon atoms.

The term "metal" includes pure metal material and metal alloy which is composed of two or more elements at least one of which is a metal.

The term "dielectric constant Dk (ε') is the relative permittivity, or the relative static permittivity in some cases. Generally, Dk in the present invention represents the permittivity expressed as a ratio relative to the vacuum permittivity. In the present invention, the dielectric constant Dk is measured according to GB9534-88.

The dissipation factor Df (ε"/ε') is also known as the tangent of the loss angle (also called tan δ), representing loss amount for dielectric constant and related to real and imaginary dielectric constant.

The term "copolymer" refers to the polymer containing more than two types of monomers, such as terpolymers.

DETAILED DESCRIPTION OF THE INVENTION

Disclosed is one polybutylene terephthalate composition, comprising as component (A) polybutylene terephthalate (PBT) resin in an amount of from 40 wt % to 90 wt %, as component (B) glass fiber having dielectric constant (Dk) of equal to or less than 4.6 and dissipation factor (Df) of less than 0.004 at a frequency from 1 GHz to 78 GHz, and Dk of equal to or less than 4.2 and Df of 0.001 to 0.0035 at a frequency of 79 GHz to 85 GHz, the dielectric constant Dk and dissipation factor Df of glass fibers is measured according to GB 9534-88.

The polybutylene terephthalate resin (A) includes a homo-polyester or co-polyester (a polybutylene terephthalate, a polybutylene terephthalate co-polyester). The polybutylene terephthalate resin contains a butylene terephthalate as a main component, which is obtainable by a common method, for example by the polycondensation of polymerization components comprising a dicarboxylic acid component including at least one terephthalic acid and/or the ester derivative thereof and a glycol component including at least one 1,4-butane diol and/or the ester derivative thereof.

The polybutylene terephthalate composition according to the present invention contains a polybutylene terephthalate resin, which is obtainable by a common polymerization method, for example by the polycondensation of a first dicarboxylic acid component comprising at least a terephthalic acid and/or the ester derivative thereof as the main polymerization component with a first glycol component comprising at least an alkylene glycol having a carbon number of four (1,4-butane diol) and/or the ester derivative thereof as the main polymerization component.

Any known polybutylene terephthalate resin could be used in the present invention. The present invention is not limited in crystallization property, kind or amount of a terminal group of the polybutylene terephthalate, intrinsic viscosity, molecular weight, linear or branched structure, kind or amount of a polymerization catalyst, and a polymerization method.

The polybutylene terephthalate resin may contain polymerization components other than terephthalic acid or the ester derivative thereof, or 1,4-butane diol or the ester derivative thereof within the range not impairing the characteristics. For example, the other polymerization components are preferably in an amount of less than or equal to 40 mol %, particularly less than or equal to 20 mol %, based on the total polymerization components of the polybutylene terephthalate resin.

Examples of the other polymerization components include aliphatic dicarboxylic acids having up to 20 carbon atoms, cycloaliphatic dicarboxylic acids having 7 to 12 carbon atoms, and/or aromatic dicarboxylic acids having 8 to 16 carbon atoms, preferably is selected from the group consisting of succinic acid, glutaric acid, adipic acid, pimelic acid, suberic acid, sebacic acid, azelaic acid, undecanedicarboxylic acid, dodecanedicarboxylic acid, tridecanedioic acid, tetradecanedioic acid, pentadecanoic acid, hexadecanedicarboxylic acid, dimeric acid, isophthalic acid, phthalic acid, 2,6-naphthalene dicarboxylic acid, hexahydrophthalic acid, hexahydroisophthalic acid, hexahydroterephthalic acid, 1,2-cyclopentanedicarboxylic acid, 1,3-cyclopentanedicarboxylic acid, himic acid, 4,4'-diphenyldicarboxylic acid, 4,4'-diphenyletherdicarboxylic acid, 4,4'-diphenylmethanedicarboxylic acid and 4,4'-diphenylketonedicarboxylic acid, more preferably is succinic acid, glutaric acid, adipic acid, pimelic acid, sebacic acid, isophthalic acid and/or phthalic acid. These components may be used singly alone, or by mixing two or more kinds thereof.

Examples of the other polymerization components include aliphatic glycol having 2 to 12 carbon atoms, cycloaliphatic glycol having 6 to 12 carbon atoms, polyoxyalkylene glycol having a plurality of oxyalkylene units of which the carbon atom number is 2 to 4, and/or aromatic glycol having 6 to 14 carbon atoms, preferably is selected from the group consisting of ethylene glycol, propylene glycol, 1,3-butylene glycol, trimethylene glycol, 1,6-hexanediol, neopentanediol, 1,3-octanediol, diethylene glycol, triethylene glycol, dipropylene glycol, tripropylene glycol, ditetramethylene glycol, decanediol, 1,4-cyclohexanediol, 1,4-cyclohexanedimethanol, bis-1,4-(hydroxymethyl)cyclohexane, diethylene glycol, polytetramethylene glycol, bisphenols, xylylene glycol and naphthalene diol, more preferably is ethylene glycol and/or diethylene glycol. These components may be used singly alone, or by mixing two or more kinds thereof.

Examples of the polybutylene terephthalate resin include polybutylene terephthalate, polybutylene(terephthalate/isophthalate), polybutylene (terephthalate/adipate), polybutylene (terephthalate/sebacate), polybutylene (terephthalate/decane dicarboxylate), polybutylene (terephthalate/naphthalate) and poly(butylene/ethylene) terephthalate.

The polybutylene terephthalate composition preferably comprises 25 wt % to 90 wt % of the polybutylene terephthalate resin based on the total weight of the polybutylene terephthalate composition. For example, the polybutylene terephthalate resin disclosed herein may be in the range from 20 wt % to 70 wt %, 30 wt % to 70 wt %, 30 wt % to 40 wt %, or 45 wt % to 70 wt % based on the total weight of the polybutylene terephthalate composition.

The viscosity number of the polybutylene terephthalate resin is suitable in the range from 90 to 170 $cm^3/g$, preferably from 100 to 135 $cm^3/g$, more preferably from 100 to 120 $cm^3/g$, measured in a 0.005 g/ml phenol/1,2-dichlorobenzene solution (1:1 mass ratio), according to ISO 1628-5.

In one embodiment of the invention, the polybutylene terephthalate resin is linear polybutylene terephthalate resin.

The crystalline of the polybutylene terephthalate polymer is generally 38% to 70%, determined by differential scanning calorimetry (DSC).

The glass fibers (B) in the present invention are selected from D-glass, having dielectric constant (Dk) equal to or less than 4.6, preferably 4.4-4.6, and dissipation factor (Df) of less than 0.004, preferably 0.002-0.003 at a frequency from 1 GHz to 78 GHz, and dielectric constant (Dk) is equal to or less than 4.2, preferably 3.5-4.2 and dissipation factor (Df) is 0.001-0.0035, preferably 0.001-0.0015 at a frequency of 79 GHz to 85 GHz, the dielectric constant (Dk) and dissipation factor (Df) of glass fibers is measured according to GB 9534-88.

The specimen of dielectric property testing method according to GB 9534-88 is prepared by melting the glass fibers (B) and molding the melted glass into a glass plate having the size of 60 mm*60 mm*2 mm (length*width*thickness). Dk or Df is the instinct property of material, it doesn't vary with the shape/size change.

The glass fiber (B) of the present invention improves the laser welding performance of PBT composition, keeps the PBT composition in a quite low dielectric constant and dissipation factor.

The glass fiber in the present invention could be unsized glass fiber or sized glass fiber with adhesive. The adhesive is selected from the group consisting of silane coupling agents, urethane adhesive, epoxide adhesive, and/or amino-silane acid copolymers.

The silane coupling agent in the invention preferable is at least one selected from the group consisting of epoxy functional silane, urethane functional silane and amino ureide functional silane, more preferable is at least one selected from the group consisting of epoxycyclohexyl functional silane, glycidoxy functional silane, isocyanate functional silane and amino ureide functional silane, most preferably is at least one selected from 2-(3,4-epoxycyclohexyl)ethyltrimethoxysilane, 3-glycidoxypropyl methyldimethoxysilane, 3-glycidoxypropyl trimethoxysilane, 3-glycidoxypropyl methyldiethoxysilane, 3-glycidoxypropyl triethoxysilane, N-2-(aminoethyl)-3-aminopropylmethyldimethoxysilane, N-2-(aminoethyl)-3-aminopropyltrimethoxysilane, N-2-(aminoethyl)-3-aminopropylmethyldimethoxysilane, N-2-(aminoethyl)-3-aminopropyltributoxysilane, N-2-(aminoethyl)-3-aminopropylmethyldiethoxysilane, N-2-(aminoethyl)-3-aminopropyltriethoxysilane, 3-aminopropyltrimethoxysilane, 3-aminopropylmethyldiethoxysilane, 3-aminopropylmethyldimethoxysilane, 3-aminopropyldimethylmethoxysilane, 3-aminopropyldimethylethoxysilane, 3-aminopropyltriethoxysilane, 3-triethoxyysily-N-(1,3 dimethyl-butylidene) propylamine, N-phenyl-3-aminopropyltrimethoxysilane, N-(vinylbenzyl)-2-aminoethyl-3-aminopropyltrimethoxysilane hydrochloride, 3-ureidopropyltrialkoxysilane and 3-isocyanatepropyltriethoxysilane.

The preferable urethane is polyurethane adhesive, such as one component polyurethane adhesive, or two components polyurethane adhesive.

The glass fiber (B) in the present invention is preferably the chopped or milled glass fiber. The glass fiber (B) could have various cross section, such as circular or non-circular.

The polybutylene terephthalate composition preferably comprises 10 wt % to 40 wt % of glass fiber (B) based on the total weight of the polybutylene terephthalate composition. For example, the polybutylene terephthalate resin disclosed herein may be in the range from 15 wt % to 30 wt %, based on the total weight of the polybutylene terephthalate composition.

The length of the glass fibers is preferably in a range of 3 mm to 9 mm, and the diameter of the cross sections of the glass fiber is preferably in a range of 7-14 um.

The polybutylene terephthalate composition optionally comprises secondary polymer (C) which is selected from the group consisting of polyolefin, cyclic olefin copolymer and poly(arylene ether), more preferably polypropylene, polyethylene, cyclic olefin copolymer (COC) and poly(phenylene ether), most preferably is high density polyethylene, cyclic olefin copolymer and poly(phenylene ether).

In one preferred embodiment, the polyolefin is polypropylene. The polypropylene herein refers to a polymer made from over 80 mol % propylene derived units, preferably from 90 mol % to 100 mol %. The polypropylene is a homopolymer of propylene. And optionally, the polypropylene could also be a copolymer of propylene and the other olefin containing from 3 to 16 carbon atoms, preferably from 3 to 8 carbon atoms. The examples of the other olefin herein could be 1-ethylene, 1-pentene, 1-hexene and 1-octene.

The polypropylene in the present invention has the other monomeric units from 0 mol % to 20 mol %. The polypropylene in the present invention is not limited in crystallization property, type or amount of a terminal group of polypropylenes, intrinsic viscosity, molecular weight, linear or branched structure, type or amount of a polymerization catalyst, and a polymerization method. Polypropylene is described for example in Römpp Chemie Lexikon, 9th edition, page 3570 ff, Georg Thieme Verlag, Stuttgart.

The number-average molar mass molecular weight (Mn) of polypropylene is generally in the range from 10,000 to 800,000 g/mol, preferably from 150,000 to 300,000 g/mol, in particular from 150,000 to 250,000 g/mol, and especially 300,000 to 500,000 g/mol, measured by gel permeation chromatography method.

The polypropylene in the polybutylene terephthalate composition could be in an amount of 5 to 35 wt %, more preferably is 25 to 35 wt % or 5 to 15 wt %, based on the total weight of polybutylene terephthalate composition.

In one preferred embodiment, the polyolefin is polyethylene. The polyethylene can be interpreted into kinds of commercial polyethylene, and preferably in an amount of 5 wt % to 35 wt %, based on the total weight of polybutylene terephthalate composition.

In one preferred embodiment, the polyolefin is high density polyethylene ("HDPE"). The term of "high density polyethylene" refers to a polymer made from over 80 mol % ethylene derived units, preferably from 90 mol % to 100 mol %, having a density of more than 0.93 $g/cm^3$, preferably from 0.94 to 0.97 $g/cm^3$, more preferably from 0.94 to 0.96 $g/cm^3$. The polyethylene is a homopolymer of ethylene. And optionally, the polyethylene could also be a copolymer of ethylene and the other olefin containing from 3 to 16 carbon atoms, preferably from 3 to 8 carbon atoms. The examples of the other olefin herein could be 1-butene, 1-pentene, 4-methyl-1-pentene, 1-hexene, 1-octene and 1-decene.

The HDPE can be prepared using any conventional polymerization process, such as a solution, suspension or gas phase process, and a suitable catalyst, such as a Ziegler-Natta catalyst or a metallocene catalyst.

The HDPE in the present invention has the other monomeric units from 0 mol % to 20 mol %. The HDPE in the present invention is not limited in crystallization property, type or amount of a terminal group of polypropylenes, intrinsic viscosity, molecular weight, linear or branched structure, type or amount of a polymerization catalyst, and a polymerization method.

The HDPE in the polybutylene terephthalate composition could be in an amount of 5 to 35 wt %, more preferably is 25 to 35 wt % or 5 to 15 wt %, based on the total weight of the polybutylene terephthalate.

In one preferred embodiment, the polyolefin is low density polyethylene ("LDPE"). The term of "low density polyethylene" refers to a polymer made from over 80 mol % ethylene derived units, preferably from 90 mol % to 100 mol %, having a density of 0.91-0.93 g/cm$^3$. The LDPE in the polybutylene terephthalate composition could be in an amount of 5 to 35 wt %, based on the total weight of the polybutylene terephthalate.

In one preferred embodiment, the polyolefin is linear low density polyethylene ("LLDPE").

The number-average molar mass molecular weight (Mn) of polyethylene is generally in the range from 100,000 to 1000,000 g/mol, preferably from 200,000 to 500,000 g/mol, in particular from 250,000 to 400,000 g/mol, and especially 30,000 to 50,000 g/mol, measured by gel permeation chromatography method. The LLDPE in the polybutylene terephthalate composition could be in an amount of 5 to 35 wt %, based on the total weight of the polybutylene terephthalate.

The term of "cyclic olefin copolymer" refers to a copolymer containing cyclic olefin units and acyclic olefin units, the mole ratio of these two units is generally in the range from 6:4 to 9:1.

The cyclic olefin units are derived from cyclic olefin monomers, which are preferably selected from the group consisting of cyclopentene-based olefins, norbornene-based olefins, tetracyclododecene-based olefins, dicyclopentadiene-based olefins, and derivatives thereof, preferably are norbornene, tetracyclododecene and dicyclopentadiene. The derivative includes a derivative substituted with an alkyl group having 1 to 20 carbon atoms, an alkylene group having 1 to 20 carbon atoms, an aralkyl group having 6 to 18 carbon atoms, a cycloalkyl group having 3 to 30 carbon atoms. More preferably, the alkyl group has from 1 to 10 carbon atoms, the alkylene group has from 1 to 10 carbon atoms, the aralkyl group has from 6 to 18 carbon atoms, the cycloalkyl group has from 3 to 18 carbon atoms, such as benzyl, phenethyl and phenylpropyl, etc.

The acyclic olefins units are derived from acyclic olefin monomers, which are preferably selected from the group consisting of branched and unbranched olefins having from 2 to 20 carbon atoms, preferable having from 2 to 10 carbon atoms. The acyclic olefins suitable for use in the present invention preferably have the following Structure I:

Structure I

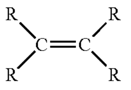

Wherein each R is individually selected from the group consisting of hydrogen and an alkyl group having from 1 to 20 carbon atoms, preferably from 1 to 10 carbon atoms. The examples of acyclic olefins herein are ethylene, propylene and butene, with ethylene being most preferred.

The mole ratio of cyclic olefin monomers to acyclic olefin monomers are preferably 60:40 to 90:10, more preferably is 65:35 to 80:20.

There is no limitation of crystallization form of the cyclic olefin copolymer in the present invention can be in the form of crystalline, semi-crystalline or amorphous, preferably is amorphous. The cyclic olefin copolymer has a glass transition temperature $T_g$ of 65° C.-178° C.

The cyclic olefin copolymer in the present invention preferably have a weight average molecular weight (Mw) of from about 100,000 to 400,000 g/mol, and more preferably from about 150,000 to 300,000 g/mol, measured by gel permeation chromatography method.

The cyclic olefin copolymer in the polybutylene terephthalate composition could be in an amount of 5 to 35 wt %, more preferably is 25 to 35 wt %, based on the total weight of polybutylene terephthalate composition.

In one preferred embodiment, the cyclic olefin copolymer is ethylene-norbornene copolymer. Examples of the copolymer obtained by this method include TOPAS® manufactured by Goodfellow Corporation and TOPAS Advanced Polymers, and APEL® manufactured by Mitsui Chemicals. A method suitable for the manufacture of such copolymers is disclosed in U.S. Pat. No. 6,008,298, the disclosure of which is incorporated herein by reference.

In one preferred embodiment, the cyclic olefin copolymer is ethylene-cyclopentadiene copolymer.

The term of "poly(arylene ether)" refers to the polymer with the structural unit of the Formula (II):

Formula II

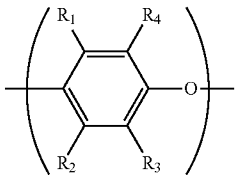

wherein for each structural unit, $R_1$ to $R_4$ are each independently hydrogen, halogen, alkyl, phenyl, alkyl phenyl, phenol, alkyl phenol, haloalkyl or aminoalkyl; herein the alkyl contains 1-8 carbon atoms.

The poly (arylene ether) includes poly (arylene ether) homo-polymers, poly (arylene ether) copolymers and/or poly (arylene ether) ionomers. Herein, there is no limitation of the type of the copolymer, for example block copolymer, graft copolymer, random copolymer or alternating copolymer. In the invention, the poly (arylene ether) copolymer is the copolymer in which at least one kind of structural unit is arylene ether.

The preferred examples of poly(arylene ether) is poly(2,6-dimethyl-1,4-phenylene ether)("PPO"), poly(2-methyl-6-ethyl-1,4-phenylene ether), poly(2-methyl-6-phenyl-1,4-phenylene ether), poly(2,3,6-trimethyl-1,4-phenylene ether), poly(2,6-dichloro-1,4-phenylene ether), poly(2,6-dimethylphenol-1,4-phenylene ether), and/or poly(2,3,6-trimethylphenol-1,4-phenylene ether), more preferably is poly (2,6-dimethyl-1,4-phenylene ether), poly(2-methyl-6-ethyl-1,4-phenylene ether), poly(2-methyl-6-phenyl-1,4-phenylene ether) and mixture thereof.

Manufacturing method to the poly (phenylene ether) that uses in the present embodiment is not particularly limited, so long as known method gets final product. As its manufacture method, for example can refer to the manufacturing method that U.S. Pat. Nos. 3,306,874, 3,306,875, 3,257,357.

The number average molecular weight (Mn) of poly (phenyl ether) is preferably 5000 to 100,000, more preferably is 3,000 to 70,000, furthermore preferably is 20,000 to 50,000, most preferably is 30,000 to 50,000, measured by GPC. PPO used herein has a glass transition temperature higher than 150° C., more preferably higher than 180° C.

The poly (phenylene ether) in the polybutylene terephthalate composition could be in an amount of 5 to 35 wt %, more preferably is 10 to 30 wt %, based on the total weight of polybutylene terephthalate composition.

The secondary polymer (C) could be the mixture of the component (C) mentioned above.

The polybutylene terephthalate composition optionally comprises impact modifier (D), especially together with secondary polymer (C).

The impact modifier is preferably derived from at least one of alpha-olefin and/or diene, and at least one of ethylenically unsaturated carboxylic acid and epoxy compound, ester and acid anhydride thereof.

The alpha-olefin preferably has from 2 to 20 carbon atoms, more preferably has from 4 to 10 carbon atoms. Examples of the alpha-olefin are ethylene, propylene, 1-butylene, isobutene, 1-pentene, 1-hexene, 1-octene, 4-methyl-1-pentene, 3-methyl-1-pentene, 3,5,5-trimethyl-1-hexene, 1-decene and mixture thereof, more preferably is ethylene, propylene, 1-butene, 1-hexene, isobutene, mixture of ethylene and propylene, mixture of ethylene and 1-octene, mixture of ethylene and 1-butene, mixture of propylene and 4-methyl-1-pentene, mixture of propylene and 1-butene, mixture of ethylene, propylene and 1-butene, and mixture of 1-decene and 1-methyl-1-pentene, most preferably is ethylene, 1-butene, 1-propylene, 1-pentene, and mixture of ethylene and 1-octene.

The diene is preferably conjugated diene such as 1,3-butadiene, 1,3-pentadiene, isoprene, 1,3-hexadiene and mixtures thereof, non-conjugated dienes having from 5 to 25 carbon atoms such as 1,4-pentadiene, 1,4-hexadiene, 1,5-hexadiene, 2,5-dimethyl-1,5-hexadiene, 1,4-octadiene and mixtures thereof, cyclic dienes such as cyclopentadiene, cyclohexadiene, cyclooctadiene, dicyclopentadiene, alkenylnorbornene such as 5-ethylidene-2-norbornene, 5-butylidene-2-norbornene, 2-methallyl-5-norbornene and 2-isopropenyl-5-norbornene and tricyclodiene, such as 3-methyltricyclo[5.2.1.0.2.6]-3,8-decadiene, and mixtures thereof. Preference is given to 1,3-butadiene, 1,3-pentadiene and/or isoprene, more preferably is 1,3-butadiene.

In one embodiment of the present invention, the impact modifier is derived from at least two monomers of alpha-olefins, or the combination of alpha-olefin and conjugated diene.

In one embodiment of the present invention, the impact modifier is derived from two monomers of ethylene, propylene, and/or octene. The impact modifier is preferably ethylene-propylene (EPM) rubber, or ethylene-octene copolymer.

In one embodiment of the present invention, the impact modifier is derived from two monomers of alpha-olefin and styrene, such as styrene-ethylene-propylene-styrene copolymer (SEPS) and styrene-ethylene-butylene-styrene copolymer (SEBS).

In one embodiment of the present invention, the impact modifier is derived from alpha-olefin and diene. The impact modifier is preferably ethylene-propylene-diene (EPDM) rubber.

Examples of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadiene, cyclooctadiene and dicyclopentadiene, and also alkenyl norbornene, such as 5-ethylidene-2-norbornene, 5-butylidene-2-norbornene, 2-methallyl-5-norbornene and 2-isopropenyl-5-norbornene, and tricyclodiene, such as 3-methyltricyclo[5.2.1.0.2.6]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

The ethylenically unsaturated nitrile monomer is preferably selected from the group consisting of acrylonitrile, methacrylonitrile, fumaronitrile and α-cyanoethylacrylonitrile, more preferably is acrylonitrile and/or methacrylonitrile, most preferably is acrylonitrile.

The ethylenically unsaturated carboxylic acid has at least one carbon-carbon double bond and at least one carboxyl group. Examples of the ethylenically unsaturated carboxylic acid are acrylic acid, methacrylic acid, maleic acid, fumaric acid, glutaconic acid, itaconic acid, citraconic acid, 2-ethylacrylic acid, 2-chloroacrylic acid, crotonic acid, isocrotonic acid, angelic acid, sorbic acid, mesaconic acid, cinnamic acid, more preferably are acrylic acid, methacrylic acid, maleic acid, fumaric and/or citraconic acid.

The epoxy compound of the ethylenically unsaturated carboxylic acid could be carboxylic acid glycidyl ester, glycidyl ether, and/or the like. Examples of the epoxy compound of the ethylenically unsaturated acid are glycidyl acrylate, glycidyl methacrylate, maleic acid 1-glycidyl ester, diglycidyl ester of maleic acid, monoglycidyl ester of itaconic acid, diglycidyl ester of itaconic acid, monoglycidyl ester of citraconic acid, diglycidyl ester of citraconic acid, monoglycidyl ester of butenetricarboxylic acid, preferably is glycidyl acrylate and/or glycidyl methacrylate.

The ester of the ethylenically unsaturated carboxylic acid is preferably the ester of acrylic acid and/or acetic acid, more preferably is an alkyl ester and/or a hydroxy alkyl ester of acrylic acid and/or acetic acid, such as $C_1$-$C_{18}$, more preferably $C_1$-$C_{12}$, most preferably $C_1$-$C_4$ alkyl ester and/or $C_1$-$C_{18}$, more preferably $C_1$-$C_{12}$, most preferably $C_1$-$C_4$ hydroxy alkyl ester of acrylic acid and/or acetic acid. Examples of the ester of the ethylenically unsaturated carboxylic acid are methyl methacrylate, methyl acrylate, ethyl methacrylate, ethyl acrylate, propyl acrylate, propyl methacrylate, butyl acrylate, butyl methacrylate, isobutyl acrylate, isobutyl methacrylate, 2-ethylhexyl acrylate, octyl acrylate, octyl methacrylate, decyl acrylate, decyl methacrylate, isodecyl acrylate, isodecyl methacrylate, lauryl acrylate, lauryl methacrylate, dimethyl maleate, monomethyl maleate, hydroxyethyl methacrylate (HEMA), stearyl methacrylate, stearyl acrylate, isobornyl acrylate, isobornyl methacrylate, hydroxypropyl methacrylate and vinyl acetate; more preferably is methyl methacrylate, methyl acrylate, ethyl methacrylate, ethyl acrylate, propyl acrylate, propyl methacrylate, butyl acrylate, butyl methacrylate, isobutyl acrylate, and/or isobutyl methacrylate, most preferably is methyl methacrylate, methyl acrylate, ethyl acrylate, butyl acrylate and/or butyl methacrylate.

The acid anhydride of the ethylenically unsaturated carboxylic acid is preferably selected from the group consisting of maleic anhydride (MAH), acrylic anhydride, methacrylic anhydride, itaconic anhydride, citraconic anhydride, fumaric anhydride, nadic anhydride, methyl nadic anhydride, himic anhydride, and methyl himic anhydride, more preferably is maleic anhydride, (meth)acrylic anhydride and/or fumaric anhydride.

The monomer of the impact modifier is preferably selected from the group consisting of ethylene, 1-butene, 1-propylene, 1-pentene, 1-octene, 1,3-butadiene, acrylonitrile, methacrylonitrile, glycidyl acrylate, glycidyl methacrylate, methyl methacrylate, methyl acrylate, butyl acrylate, butyl methacrylate, maleic anhydride, acrylic anhydride, glycidyl acrylate, and glycidyl methacrylate.

Polymers of the impact modifier are described by way of example in Houben-Weyl, Methoden der organischen Chemie, volume 14/1 (Georg-Thieme-Verlag, Stuttgart, 1961), pp 392 to 406, and in the monograph "Toughened Plastics" by C. B. Bucknall (Applied Science Publishers, London, 1977).

In one embodiment of the present invention, the impact modifier is derived from at least one monomer of alpha-olefin, and at least one monomer of epoxy compound of ethylenically unsaturated carboxylic acid. The alpha-olefin herein is preferably ethylene, butylene, propylene and octene. The examples of the epoxy compound of the ethylenically unsaturated carboxylic acid herein are preferably glycidyl acrylate and/or glycidyl methacrylate (GMA). The epoxy compound of ethylenically unsaturated carboxylic acid herein is preferably grafted to the polyolefin blocks or copolymerized to polyolefin blocks. The impact modifier is preferably GMA grafted ethylene, GMA grafted polypropylene, GMA grafted ethylene-butylene copolymer, GMA grafted ethylene-octene.

In one embodiment of the present invention, the impact modifier is derived from alpha-olefin, epoxy compound of ethylenically unsaturated carboxylic acid and styrene. The alpha-olefin herein is preferably ethylene, butylene and/or propylene, more preferably is ethylene and butylene. The examples of the epoxy compound of the ethylenically unsaturated carboxylic acid herein are preferably glycidyl acrylate and/or glycidyl methacrylate (GMA). The epoxy compound of ethylenically unsaturated carboxylic acid thereof herein is preferably grafted to the polyolefin/polystyrene co-blocks or copolymerized to polyolefin/polystyrene co-blocks.

In one preferred embodiment of the present invention, the impact modifier is GMA grafted polypropylene or GMA grafted styrene-ethylene-butylene (SEBS) copolymer.

In one embodiment of the present invention, the impact modifier is derived from at least one alpha-olefin, at least one of ethylenically unsaturated carboxylic acid and at least one of epoxy compound of ethylenically unsaturated carboxylic acid. The examples of the alpha-olefin herein are ethylene, butylene and propylene. The examples of the ethylenically unsaturated carboxylic acid are acrylic acid, methacrylic acid, maleic acid and fumaric, preferably is acrylic acid and methacrylic acid. The examples of the epoxy compound of the ethylenically unsaturated carboxylic acid herein are preferably glycidyl acrylate and/or glycidyl methacrylate (GMA). The impact modifier is preferably ethylene/acrylic/GMA ternary copolymer.

In one embodiment of the present invention, the impact modifier is derived from at least one alpha-olefin, at least one of ester of ethylenically unsaturated carboxylic acid and at least one poly(ester ether) elastomer. The examples of alpha-olefin herein are ethylene and/or butylene. The examples of the ester of the ethylenically unsaturated carboxylic acid herein are methyl methacrylate, methyl acrylate, ethyl acrylate, butyl acrylate and/or butyl methacrylate. The examples of the poly(ester ether) elastomer herein are the copolymers of polyester and polyether, for example the copolymer of PBT and polyethylene glycol (PEG), preferably having the Shore hardness of 30D-40D.

The impact modifier in the polybutylene terephthalate composition could be in an amount of 5 to 15 wt %, more preferably is 5 to 10 wt %, based on the total weight of polybutylene terephthalate composition.

In one embodiment of the present invention, the impact modifier is preferably GMA grated ethylene-octene, GMA grated polypropylene, GMA grafted ethylene-butylene, SEBS, EPM, EPDM, and/or MBS.

The polybutylene terephthalate composition optionally comprises additives (E) other than impact modifier.

The additives (E) are preferably used in an amount of 0 wt % to 10 wt %, more preferably is from 0.1 wt % to 5 wt %, most preferably is from 0.5 wt % to 3 wt %, based on the total weight of the polybutylene terephthalate composition.

Additives used according to the invention are preferably lubricants, stabilizers, antioxidant agents, demolding agents, UV stabilizers, thermal stabilizers, gamma ray stabilizers, antistatic agents, flow aids, flame retardants, elastomer modifiers, acid scavengers, emulsifiers, nucleating agents, plasticizers and/or pigments. These and further suitable additives are described, for example, in Gächter, Müller, Kunststoff-Additive [Plastics Additives], 3rd edition, Hanser-Verlag, Munich, Vienna, 1989 and in the Plastics Additives Handbook, 5th Edition, Hanser-Verlag, Munich, 2001. The additives can be used alone or in a mixture, or in the form of masterbatches.

In one preferred embodiment of the invention, the polybutylene terephthalate composition according to the invention may further include one or more lubricant and/or processing agent. If included, the lubricant and/or processing agent is preferably an ester or amide of saturated aliphatic carboxylic acids having from 10 to 40 carbon atoms and/or saturated aliphatic alcohols or amines having from 2 to 40 carbon atoms. A preferred lubricant is pentaerythritol tetrastearate, fatty acid ester of pentaerythritol having 10 to 20 carbon atoms.

The lubricant is preferably present in an amount of about 0 wt % to 3 wt %, more preferably of about 0.01 wt % to 2 wt %, and most preferably of about 0.2 wt % to 1 wt %, each based on the total weight of the polybutylene terephthalate composition according to the invention.

In one preferred embodiment of the invention, the polybutylene terephthalate composition according to the invention may further include one or more antioxidant agent. Antioxidant agents used are preferably aromatic amine-based antioxidant agent, hindered phenol-based antioxidant agents and phosphite-based antioxidant agents.

Examples of aromatic amine-based antioxidant agent are poly(1,2-dihydro-2,2,4-trimethyl-quinoline), bis(4-octylphenyl)amine, 4,4'-bis(α,α-dimethylbenzyl)diphenylamine, N,N'-di-2-naphthyl-p-phenylenediamine, N,N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, and/or N, N'-bis (methylphenyl)-1,4-benzenediamine.

Examples of hindered phenol-based antioxidant agents are poly(oxy-1,2-ethanediyl)-alpha-[3-[3,5-bis(1,1-dimethylethyl)-4-hydroxyphenyl]-1-oxopropyl]-omega-[3-[3,5- bis(1,1-dimethylethyl)-4-hydroxyphenyl]-1-oxopropoxy], 2,4-bis[(octylthio)methyl]-o-cresol, octyl-3,5-di-tert-butyl-4-hydroxy-hydrocinnamate, 3,5-bis(1,1-dimethylethyl)-4-hydroxybenzenepropanoic acid C7-C9-branched alkyl ester. And preferably the solid hindered phenol-based antioxidant agent is one or more selected from group "B-S" consisted of 2,4-bis[(dodecylthio)methyl]-o-cresol, 4,4'-butylidene bis-(3-methyl-6-tert-butylphenol), 3,5-bis(1,1-dimethylethyl)-4-hydroxybenzenepropanoic acid octadecyl ester, pentaerythritol tetrakis(3-(3,5-di-tert-butyl-4-hydroxyphenyl) propionate), triethylene glycol-bis[3-(3-tert-butyl-5-methyl-4-hydrophenyl)propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, 2,2-thio-diethylene bis[3-(3,5-di-tert-butyl-4-hydroxyphenyl) propionate].

Examples of phosphite-based antioxidant agents are tris (2,4-di-tert-butylphenyl)phosphite (Irgafos® 168, BASF SE, CAS 31570-04-4), bis(2,4-di-tert-butylphenyl)pentaerythrityl diphosphite (Ultranox® 626, Chemtura, CAS 26741-53-7), bis(2,6-di-tert-butyl-4-methylphenyl)pentaerythrityl diphosphite (ADK Stab PEP-36, Adeka, CAS 80693-00-1), bis(2,4-dicumylphenyl)pentaerythrityl diphosphite (Doverphos® S-9228, Dover Chemical Corporation, CAS 154862-43-8), tris(nonylphenyl)phosphite (Irgafose TNPP, BASF SE, CAS 26523-78-4), (2,4,6-tri-t-butylphenol)-2-butyl-2-ethyl-1,3-propanediol phosphite (Ultranox® 641, Chemtura, CAS 161717-32-4) and Hostanox® P-EPQ.

The antioxidant agent is preferably present in an amount of about 0 wt % to 2 wt %, more preferably of about 0.01 wt % to 1 wt %, and most preferably of about 0.2 wt % to 0.8 wt %, each based on the total weight of the polybutylene terephthalate composition according to the invention.

In one preferred embodiment of the invention, the polybutylene terephthalate composition according to the invention may further include one or more adhesive adjuvant.

Examples of adhesive adjuvants are epoxide, such as epoxidized alkyl esters of fatty acid, such as epoxidized linseed oil, epoxidized soybean oil, epoxidized rapeseed oil and epoxy resin such as bisphenol-A resin.

The adhesive adjuvant is preferably present in an amount of about 0 wt % to 3 wt %, more preferably of about 0.01 wt % to 2 wt %, and most preferably of about 1 wt % to 2 wt %, each based on the total weight of the polybutylene terephthalate composition according to the invention.

In one preferred embodiment, the polybutylene terephthalate composition preferably comprises from 25 wt % to 90 wt %, preferably from 30 wt % to 70 wt % of polybutylene terephthalate resin(A), from 10 wt % to 75 wt %, preferably from 30 wt % to 70 wt % of glass fiber (B), based on the total weight of the polybutylene terephthalate composition according to the invention.

In one preferred embodiment, the polybutylene terephthalate composition preferably comprises from 25 wt % to 90 wt %, preferably from 30 wt % to 70 wt % of polybutylene terephthalate resin (A), from 10 wt % to 75 wt %, preferably from 30 wt % to 70 wt % of glass fiber (B), from 5 wt % to 35 wt %, preferably from 25 wt % to 35 wt % or 5 wt % to 15 wt % of polyolefin (C), and from 5 wt % to 15 wt %, preferably from 5 wt % to 10 wt % of impact modifier, based on the total weight of the polybutylene terephthalate composition according to the invention. The polyolefin herein is preferably selected from the group consisting of polypropylene, polyethylene, more preferably is high density polyethylene.

In one preferred embodiment, the polybutylene terephthalate composition preferably comprises from 25 wt % to 90 wt %, preferably from 30 wt % to 70 wt % of polybutylene terephthalate resin (A), from 10 wt % to 75 wt %, preferably from 30 wt % to 70 wt % of glass fiber (B), from 5 wt % to 35 wt %, preferably from 5 wt % to 35 wt % or 25 wt % to 35 wt % of cyclic olefin copolymer (C), and from 5 wt % to 15 wt %, preferably from 5 wt % to 10 wt % of impact modifier, based on the total weight of the polybutylene terephthalate composition according to the invention.

In one preferred embodiment, the polybutylene terephthalate composition preferably comprises from 25 wt % to 90 wt %, preferably from 30 wt % to 70 wt % of polybutylene terephthalate resin (A), from 10 wt % to 75 wt %, preferably from 30 wt % to 70 wt % of glass fiber (B), from 5 wt % to 35 wt %, preferably from 25 wt % to 35 wt % of cyclic olefin copolymer (C), and from 5 wt % to 15 wt %, preferably from 5 wt % to 10 wt % of impact modifier, based on the total weight of the polybutylene terephthalate composition according to the invention; the cyclic olefin copolymer are derived from cyclic olefin monomers, which are preferably selected from the group consisting of norbornene, tetracyclododecene and dicyclopentadiene, and acyclic olefin monomers, which are preferably selected from the group consisting of ethylene, propylene and butene. The mole ratio of cyclic olefin monomers to acyclic olefin monomers are preferably 5:95 to 95:5, more preferably is 30:70 to 70:30.

In one preferred embodiment, the polybutylene terephthalate composition preferably comprises from 25 wt % to 90 wt %, preferably from 30 wt % to 70 wt % of polybutylene terephthalate resin (A), from 10 wt % to 75 wt %, preferably from 30 wt % to 70 wt % of glass fiber (B), from 5 wt % to 35 wt %, preferably from 25 wt % to 35 wt % of ethylene-norbornene copolymer or ethylene-cyclopentadiene copolymer (C), and from 5 wt % to 15 wt %, preferably from 5 wt % to 10 wt % of impact modifier, based on the total weight of the polybutylene terephthalate composition according to the invention. The mole ratio of norbornene or cyclopentadiene monomers to ethylene monomers are preferably 5:95 to 95:5, more preferably is 30:70 to 70:30.

In one preferred embodiment, the polybutylene terephthalate composition preferably comprises from 25 wt % to 90 wt %, preferably from 30 wt % to 70 wt % of polybutylene terephthalate resin (A), from 10 wt % to 75 wt %, preferably from 30 wt % to 70 wt % of glass fiber (B), from 5 wt % to 35 wt %, preferably from 10 wt % to 30 wt % of poly(arylene ether) (C), and from 5 wt % to 15 wt %, preferably from 5 wt % to 10 wt % of impact modifier, based on the total weight of the polybutylene terephthalate composition according to the invention. The examples of poly (arylene ether) are poly(2,6-dimethyl-1,4-phenylene ether) ("PPO"), poly(2-methyl-6-ethyl-1,4-phenylene ether), poly (2-methyl-6-phenyl-1,4-phenylene ether), poly(2,3,6-trimethyl-1,4-phenylene ether), poly(2,6-dichloro-1,4-phenylene ether), poly(2,6-dimethylphenol-1,4-phenylene ether), and/or poly(2,3,6-trimethylphenol-1,4-phenylene ether).

In another aspect, the present invention relates to a radar device component containing the polybutylene terephthalate composition in the present invention. The radar is preferably automobile radar or base station radar, the radar device is preferably radome, radar housing, antenna spilt and antenna screw.

In another aspect, the present invention relates to a process for preparing the polybutylene terephthalate composition according to the invention. The polybutylene terephthalate composition could be prepared or processed by various known methods, such as extruding or kneading. For example, the composition according to the present invention may be prepared or processed by (1) mixing the polybutylene terephthalate resin (A), optionally secondary polymer (C), optionally impact modifier (D) and optionally additives (F), (2) adding the glass fiber (B), extruding or kneading. It is to be understood that the components may be introduced via different hoppers depending on the forms or properties. The temperature of the extruder is the conventional processing temperature of the polybutylene terephthalate composition, preferably is from 200 to 270° C. The rational speed of the extruder is the conventional processing speed of the polybutylene terephthalate composition, preferably is from 200 to 500 rpm.

In another aspect, the present invention also relates to an article obtained or obtainable by the polybutylene terephthalate composition according to the present invention. The articles are preferably used as parts or components of automotive radar radome and housing, automobile antenna spilt and base station antenna screw.

The following examples shows the composites advantage in this invention.

EXAMPLES

The present invention will be described in more detail with reference to the following examples. The present invention, however, is not limited to these examples.

Details of the components used to evaluate properties are as follows.

The raw materials used in the examples are as follows:

Ultradur® B2550 from BASF, polybutylene terephthalate resin with viscosity number of 107 $cm^3/g$ measured in a 0.005 g/ml phenol/1,2-dichlorobenzene solution (1:1 mass ratio) according to ISO1628, number-average molar mass molecular weight (Mn) of 16500 g/mol.

E-glass fiber is NEG T187H grade from Nippon Electric Glass Co., Ltd.

Low Dk glass fiber is TLD-CS-T436S from Taishan Fiberglass Co., Ltd., having the Dk of 4.5, Df of 0.0022 at a frequency of 1 GHz; Dk of 4.2, Df of 0.0015 at a frequency of 85 GHz, measured according to GB9534-88, average length of 3 mm, average diameter of 13 μm. The specimen of Dk and Df is prepared by melting the low Dk glass fibers and molding the melted glass into a glass plate having the size of 60 mm*60 mm*2 mm (length*width*thickness).

PP is polypropylene from Yangzi Petrochemical Co. Ltd.; grade name F401.

SOG-02 is glycidyl methacrylate (GMA) grafted ethylene-octene copolymer from Fine blend Polymer (Shanghai) Co., Ltd.

HDPE is high density polyethylene with density of 0.95 $g/cm^3$ from PetroChina Lanzhou Petrochemical Company, grade name HDPE 5000s.

PPO is poly (p-phenylene oxide) with intrinsic viscosity of 35 $cm^3/g$, from China National BlueStar (Group) Co., Ltd., grade name PPO LXR35.

COC is ethylene-norbornene copolymer from Polyplastic Topas, grade name 5013L-10.

The formulations for the examples and comparative examples are shown in the following Tables 1-10. The raw materials are mixed together in a high-speed stirrer, fed into a twin-screw extruder (Berstorff ZE25), melt-extruded under a temperature of 240° C. with 300 rpm, pelletized, thus obtaining a polybutylene terephthalate composition in a pellet form. The extruding conditions for the following examples are: the zone temperature of the screw extruder is from 200° C. to 250° C.; the throughput is 30 kg/h. The testing specimens were prepared by injection molding in Arburg 370 C, the melting temperature is 260° C. and molding temperature is 80° C.

Tensile modulus, tensile strength at break and strain at break were measured according to ISO 527-1-2012. Test specimens of type 1A described in ISO 527-1-2012 were used with a thickness of 4 mm.

Charpy notched impact strength and Charpy unnotched impact strength was tested according to ISO 179-1-2010 via edgewise impact. The test specimens for Charpy unnotched test is type 1 specimen with the dimensions of 80*10*4 mm (length*width*thickness). The test specimens for Charpy notched test is type 1 with notched type A.

The Dk and Df of the PBT composition is measured by a quasi-cavity resonance method which equipped with a quasi-cavity resonator and an Agilent network analyzer at 79 GHz. The testing specimens and standard specimens are identical in size and shape of 60 mm*60 mm*2 mm (length*width*thickness) according to GB9534-88.

The laser transmittance of the PBT composition of the present invention is measured using at a specimen with thickness (plate) of 2 mm.

A thermoelectric power measurement was used to determine laser transmittance at wavelength 1064 nm. The measurement geometry was set up as follows:

A beam splitter (SQ2 nonpolarizing beam splitter from Laseroptik GmbH) was used to divide a reference beam of power 1 Watt at an angle of 90° from a laser beam (diode-pumped Nd-YAG laser of wavelength 1064 nm, FOBA DP50) with total power of 2 Watts. The reference beam impacted the reference sensor. That portion of the original beam that passed through the beam splitter provided the measurement beam likewise with power of 1 Watt. This measurement beam was focused to a focus with diameter of 0.18 μm via a mode diaphragm (5.0) which is behind the beam splitter. The laser transmittance (LT) measurement sensor was positioned 80 mm below the focus. The test sheet was positioned 2 mm above the LT measurement sensor. The total measurement time was 30 s, the measurement result being determined within the final 5 s. The signals from reference sensor and measurement sensor were captured simultaneously. The start of the measurement was simultaneous with the insertion of the sample.

Laser transmittance was obtained from the following formula:

$$\text{Laser transmittance} = \frac{\text{Signal 1}}{\text{Signal 2}} \times 100\%$$

Signal 1 is the signal captured by the measurement sensor; Signal 2 is the signal captured by the reference sensor. This method of measurement excluded variations of the laser system and subjective reading errors.

Example 1

Table 1 listed the PBT compositions including PBT as the base resin, common E-glass fiber in Comparative example 1, and low Dk and low Df glass fiber in Example 1.

TABLE 1

| Formulation of PBT + glass fiber compositions | | | |
|---|---|---|---|
| Ingredients | Unit | Comparative 1 | Example 1 |
| PBT | wt % | 70 | 70 |
| E-glass fiber | wt % | 30 | |
| TLD-CS-T436S | wt % | | 30 |

Dielectric, laser transmittance and mechanical properties of PBT composition specimen are listed in Table 2. As a result, compared to Comparative Example 1, laser transmittance of Example 1 is much better and much lower Dk and Df at 79 GHz is also observed for Example 1.

TABLE 2

| Properties of PBT + glass fiber compositions | | | |
|---|---|---|---|
| Property | Unit | Comp 1 | Example 1 |
| Tensile modulus | MPa | 10500 | 9370 |
| Tensile strength at break | MPa | 156 | 155 |
| Strain at break | % | 2.8 | 3.1 |
| Charpy notched impact strength @ 23° C. | $Kj/m^2$ | 9.5 | 12 |
| Charpy unnotched impact strength @ 23° C. | $Kj/m^2$ | 68 | 72 |
| Laser transmittance @ 2 mm | % | 15.7 | 20.3 |
| Dielectric constant Dk at 79 GHz | | 3.5 | 3.1 |
| Dissipation factor Df at 79 GHz | | 0.0077 | 0.0065 |

Examples 2-3

In Table 3, the PBT compositions (Examples 2-3) including PBT as the base resin, PP as secondary polymer component, low Dk and low Df glass fiber and a glycidyl methacrylate (GMA) grafted ethylene-octene copolymer (SOG-02) are listed.

TABLE 3

| Formulations of PBT + PP + glass fiber compositions | | | | |
|---|---|---|---|---|
| Ingredients | Unit | Example 1 | Example 2 | Example 3 |
| PBT | wt % | 70 | 52 | 32 |
| PP | wt % | | 10 | 30 |
| SOG-02 | wt % | | 8 | 8 |
| TLD-CS-T436S | wt % | 30 | 30 | 30 |

Seen from Table 4, the addition of secondary polymer PP further decreases the Dk and Df value of PBT composition, and laser transmittance is almost the same as Comparative 1, and even better for Example 3.

TABLE 4

| Properties of PBT + PP + glass fiber compositions | | | | |
|---|---|---|---|---|
| Property | Unit | Ex. 1 | Ex. 2 | Ex. 3 |
| Tensile modulus | MPa | 9370 | 7820 | 6960 |
| Tensile strength at break | MPa | 155 | 108 | 50.7 |
| Strain at break | % | 3.1 | 3.6 | 1.2 |
| Charpy notched impact strength @ 23° C. | $Kj/m^2$ | 12 | 20 | 6.5 |
| Charpy unnotched impact strength @ 23° C. | $Kj/m^2$ | 72 | 72 | 18 |

TABLE 4-continued

| Properties of PBT + PP + glass fiber compositions | | | | |
|---|---|---|---|---|
| Property | Unit | Ex. 1 | Ex. 2 | Ex. 3 |
| Laser transmittance @ 2 mm | % | 20.3 | 14.7 | 16.7 |
| Dielectric constant Dk at 79 GHz | | 3.1 | 2.99 | 2.78 |
| Dissipation factor Df at 79 GHz | | 0.0065 | 0.0052 | 0.0038 |

*Ex. represents Example.

Examples 4-5

In Table 5, the PBT compositions (Examples 4-5) including PBT as the base resin, HDPE as second resin components, low Dk and low Df glass fiber and SOG-02 are listed.

TABLE 5

| Formulation of PBT + HDPE + glass fiber compositions | | | | |
|---|---|---|---|---|
| Ingredients | Unit | Example 1 | Example 4 | Example 5 |
| PBT | wt % | 70 | 52 | 32 |
| HDPE | wt % | | 10 | 30 |
| Impact modifier | wt % | | 8 | 8 |
| TLD-CS-T436S | wt % | 30 | 30 | 30 |

Table 6 shows that the addition of secondary polymer HDPE further decreases the Dk and Df value of PBT composition, and laser transmittance is even better in the addition of HDPE.

TABLE 6

| Properties of PBT + HDPE + glass fiber compositions | | | | |
|---|---|---|---|---|
| Property | Unit | Ex. 1 | Ex. 4 | Ex. 5 |
| Tensile modulus | MPa | 9370 | 7660 | 6600 |
| Tensile strength | MPa | 155 | 109 | 61.5 |
| Strain at break | % | 3.1 | 3.7 | 1.8 |
| Charpy notched impact strength @ 23° C. | $Kj/m^2$ | 12 | 17 | 6.7 |
| Charpy unnotched impact strength @ 23° C. | $Kj/m^2$ | 72 | 68 | 21 |
| Laser transmittance @ 2 mm | % | 20.3 | 14.5 | 18.0 |
| Dielectric constant Dk at 79 GHz | | 3.1 | 2.99 | 2.85 |
| Dissipation factor Df at 79 GHz | | 0.0065 | 0.0052 | 0.0039 |

*Ex. represents Example.

Examples 6-8

In Table 7, the PBT compositions (Examples 6-8) including PBT as the base resin, PPO as secondary resin components, low Dk and low Df glass fiber and SOG-02 are listed.

TABLE 7

| Formulation of PBT + PPO + glass fiber compositions | | | | | |
|---|---|---|---|---|---|
| Ingredients | Unit | Example 1 | Example 6 | Example 7 | Example 8 |
| PBT | wt % | 70 | 52 | 42 | 32 |
| PPO | wt % | | 10 | 20 | 30 |
| Impact modifier | wt % | | 8 | 8 | 8 |
| TLD-CS-T436S | wt % | 30 | 30 | 30 | 30 |

Table 8 shows that the addition of secondary polymer PPO further decreases the Dk and Df value of PBT composition and maintain the laser transmittance at a good level, better than Comparative example 1.

TABLE 8

| Properties of PBT + PPO + glass fiber compositions | | | | | |
|---|---|---|---|---|---|
| Property | Unit | Ex. 1 | Ex. 6 | Ex. 7 | Ex. 8 |
| Tensile modulus | MPa | 9370 | 8210 | 8460 | 8050 |
| Tensile strength | MPa | 155 | 109 | 95.4 | 81.3 |
| Strain at break | % | 3.1 | 3.6 | 2.1 | 1.5 |
| Charpy notched impact strength @ 23° C. | Kj/m$^2$ | 12 | 15 | 11 | 7.5 |
| Charpy unnotched impact strength @ 23° C. | Kj/m$^2$ | 72 | 66 | 39 | 25 |
| Laser transmittance @ 2 mm | % | 20.3 | 17.2 | 17.7 | 17.7 |
| Dielectric constant Dk at 79 GHz | | 3.1 | 3.06 | 3 | 2.94 |
| Dissipation factor Df at 79 GHz | | 0.0065 | 0.0056 | 0.0052 | 0.0047 |

*Ex. represents Example.

Examples 9-10

In Table 9, the PBT compositions (Examples 9-10) including PBT as the base resin, COC as secondary resin components, low Dk and low Df glass fiber and SOG-02 are listed.

Table 10 shows that the addition of secondary polymer COC further decreases the Dk and Df value of PBT composition, and laser transmittance is even better in Example 10.

TABLE 9

| Formulation of PBT + COC + glass fiber compositions | | | | |
|---|---|---|---|---|
| Ingredients | Unit | Example 1 | Example 9 | Example 10 |
| PBT | wt % | 70 | 42 | 32 |
| COC | wt % | | 20 | 30 |
| Impact modifier | wt % | | 8 | 8 |
| TLD-CS-T436S | wt % | 30 | 30 | 30 |

TABLE 10

| Properties of PBT + COC + glass fiber compositions | | | | |
|---|---|---|---|---|
| Property | unit | Ex. 1 | Ex. 9 | Ex. 10 |
| Tensile modulus | MPa | 9370 | 8350 | 8360 |
| Tensile strength | MPa | 155 | 92.2 | 69.1 |
| Strain at break | % | 3.1 | 1.8 | 1.1 |
| Charpy notched impact strength @ 23° C. | Kj/m$^2$ | 12 | 12 | 6.4 |
| Charpy unnotched impact strength @ 23° C. | Kj/m$^2$ | 72 | 34 | 18 |
| Laser transmittance @ 2 mm | % | 20.3 | 14.5 | 16.2 |
| Dielectric constant Dk at 79 GHz | | 3.1 | 2.91 | 2.83 |
| Dissipation factor Df at 79 GHz | | 0.0065 | 0.0048 | 0.0042 |

*Ex. represents Example.

Based on the above results of examples, a high performance PBT compositions used at high frequency EM wave application, such as radome in automotive radar is prepared. This composition shows high modulus, high impact strength, good laser transmittance and quite low Dk/low Df dielectric performance at 79 GHz.

The invention claimed is:

1. A radar device component containing a polybutylene terephthalate composition, comprising:

as component (A) a polybutylene terephthalate resin in an amount of from 40 wt % to 90 wt %, and as component (B) a glass fiber having dielectric constant (Dk) of equal to or less than 4.6 and dissipation factor (Df) of less than 0.004 at a frequency from 1 GHz to 78 GHz, and Dk of equal to or less than 4.2 and Df of 0.001 to 0.0035 at a frequency of 79 GHz to 85 GHz, the dielectric constant Dk and dissipation factor Df of the glass fiber is measured according to GB 9534-88 in an amount of 10 wt % to 60 wt %.

2. The radar device component according to claim 1, wherein the glass fiber (B) has dielectric constant of 4.4-4,6, and dissipation factor of 0.002-0.003 at a frequency from 1 GHz to 78 GHz, and dielectric constant of 3.5-4.2 and dissipation factor of 0.001-0.0015 at a frequency of 79 GHz to 85 GHz.

3. The radar device component according to claim 1, wherein the composition further comprises as component (C) a secondary polymer selected from the group consisting of polyolefin, cyclic olefin copolymer, and poly (arylene ether).

4. The radar device component according to claim 3, wherein the component (C) is polypropylene in an amount of 25 wt % to 35 wt % or 5 wt % to 15 wt % based on a total weight of polybutylene terephthalate composition; or the component (C) is polyethylene in an amount of 5 wt % to 35 wt % based on a total weight of-high-density polyethylene based on the total weight of polybutylene terephthalate composition; or the component (C) is low density polyethylene in an amount of 25 wt % to 35 wt % based on the total weight of polybutylene terephthalate composition; or the component (C) is cyclic olefin copolymer in an amount of 25 wt % to 35 wt %, based on the total weight of polybutylene terephthalate composition; or the component (C) is poly (arylene ether) in an amount of 10 wt % to 30 wt %, based on the total weight of polybutylene terephthalate composition; or the component (C) is a mixture of at least two components (C) in a total amount of 5 wt % to 35 wt %, based on the total weight of polybutylene terephthalate composition.

5. The radar device component according to claim 3, wherein the cyclic olefin copolymer comprises cyclic olefin units and acyclic olefin units in a mole ratio of 6:4 to 9:1; the cyclic olefin units are derived from cyclic olefin monomers selected from the group consisting of cyclopentene-based olefins, norbornene-based olefins, tetracyclododecene-based olefins, dicyclopentadiene-based olefins, and derivatives thereof; the acyclic olefins units are derived from acyclic olefin monomers selected from the group consisting of branched and unbranched olefins having from 2 to 20 carbon atoms.

6. The radar device component according to claim 3, wherein the poly (arylene ether) is poly(2,6-dimethyl-1,4-phenylene ether), poly(2-methyl-6-ethyl-1,4-phenylene ether), poly(2-methyl-6-phenyl-1,4-phenylene ether), poly (2,3,6-trimethyl-1,4-phenylene ether), poly(2,6-dichloro-1,4-phenylene ether), poly(2,6-dimethylphenol-1,4-phenylene ether), or poly(2,3,6-trimethylphenol-1,4-phenylene ether).

7. The radar device component according to claim 1, wherein the glass fibers (B) have a dielectric constant of 4.4-4.6, and a dissipation factor (Df) of 0.002-0.003 at a frequency from 1 GHz to 78 GHz, and Dk is 3.5-4.2 and Df is 0.001-0.0015 at a frequency of 79 GHz to 85 GHz, the dielectric constant Dk and dissipation factor Df of glass fibers is measured according to GB 9534-88.

8. The radar device component according to claim 1, wherein the composition further comprises as component (D) an impact modifier in an amount of 5 wt % to 15 wt %, based on a total weight of polybutylene terephthalate composition.

9. The radar device component according to claim 8, wherein the impact modifier is derived from at least one of alpha-olefin and/or diene, and at least one of ethylenically unsaturated carboxylic acid and epoxy compound, ester and acid anhydride thereof.

10. The radar device component according to claim 1, wherein the radar device component is radome, housing, automobile antenna spilt or base station antenna screw.

11. A polybutylene terephthalate composition, comprising:

as component (A) a polybutylene terephthalate resin in an amount of from 40 wt % to 90 wt %, as component (B) a glass fiber having dielectric constant (Dk) of equal to or less than 4.6 and dissipation factor (Df) of less than 0.004 at a frequency from 1 GHz to 78 GHz, and Dk of equal to or less than 4.2 and Df of 0.001 to 0.0035 at a frequency of 79 GHz to 85 GHZ, the dielectric constant Dk and dissipation factor Df of glass fibers is measured according to GB 9534-88 in an amount of 10 wt % to 60 wt %.

12. An article produced from the polybutylene terephthalate composition according to claim 11.

13. A process for preparing the polybutylene terephthalate composition according to claim 11, comprising:

(1) mixing the polybutylene terephthalate resin (A), optionally a secondary polymer (C), optionally an impact modifier (D) and optionally additives (F), and (2) adding the glass fiber (B), and extruding or kneading.

14. The radar device component according to claim 1, wherein said component comprises a laser weld.

* * * * *